[11] 3,603,665

| [72] | Inventors | Peter C. Goldmark<br>Stamford;<br>John W. Christensen, New Canaan, both of, Conn. |
|---|---|---|
| [21] | Appl. No. | 779,196 |
| [22] | Filed | Nov. 26, 1968 |
| [45] | Patented | Sept. 7, 1971 |
| [73] | Assignee | Columbia Broadcasting System Inc. |

[54] FIBER OPTICS DISK SCANNING SYSTEMS
8 Claims, 6 Drawing Figs.

[52] U.S. Cl. .................................................. 350/96 B,
355/1, 350/274
[51] Int. Cl. .................................................. G02b 5/16
[50] Field of Search ........................................... 350/96,
274; 250/227, 233; 178/6.7, 7.6, 5.2 D, 5.4 CR;
355/1

[56] References Cited
UNITED STATES PATENTS

| 3,024,079 | 3/1962 | Salvatori et al. | 350/274 X |
|---|---|---|---|
| 3,163,080 | 12/1964 | Miller | 355/1 |
| 3,081,682 | 3/1963 | Khoury | 350/255 X |
| 3,104,324 | 9/1963 | Rabinow | 350/96 X |
| 3,184,872 | 5/1965 | Way | 350/96 X |
| 3,212,397 | 10/1965 | Miller | 350/96 X |
| 3,240,106 | 3/1966 | Hicks | 350/96 X |
| 3,325,594 | 6/1967 | Goldhammer et al. | 350/96 X |

*Primary Examiner*—David H. Rubin
*Attorney*—Brumbaugh, Graves, Donohue & Raymond ABSTRACT: Apparatus for simultaneously scanning two related frames of color TV film includes a disk rotated about its axis at high speed. Narrow radial slits in the disk cooperate with two separate fiber optics channels each formed with an entrance and a narrow exit. A lamp lights the disk, and the disk slits and exits are relatively oriented so that a scanning spot emanates from each exit and executes a rectilinear scan, notwithstanding curvilinear motion of the disk slits as the disk is rotated. Moreover, the fiber optics channels are tapered if necessary so that the scanning lines are of disk length, whether or not the disk slits are all at the same radial location.

PATENTED SEP 7 1971
3,603,665
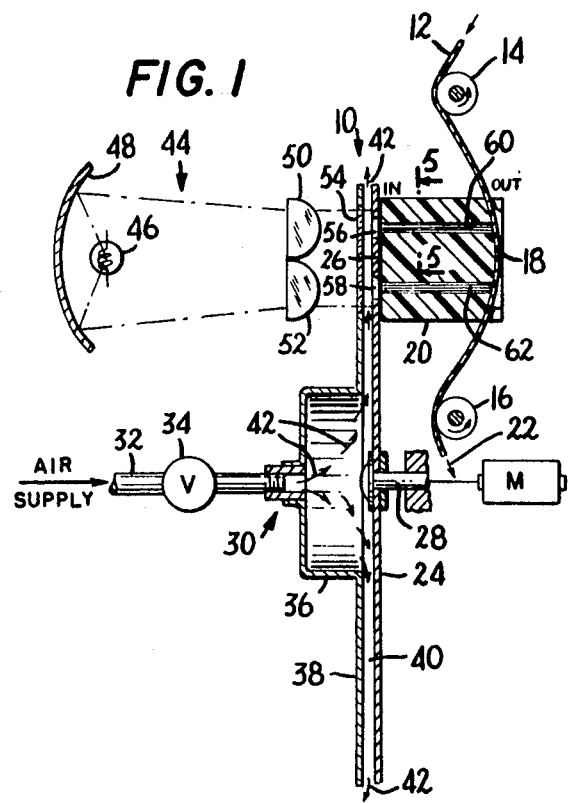
FIG. 1
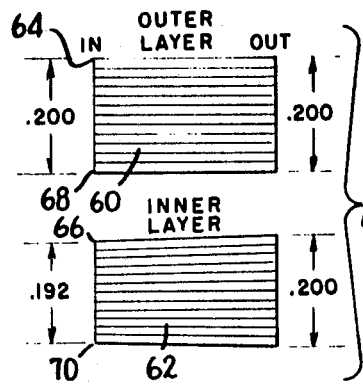
FIG. 2
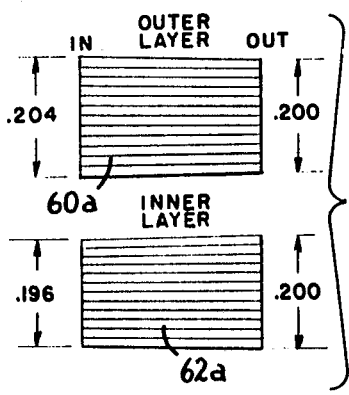
FIG. 3
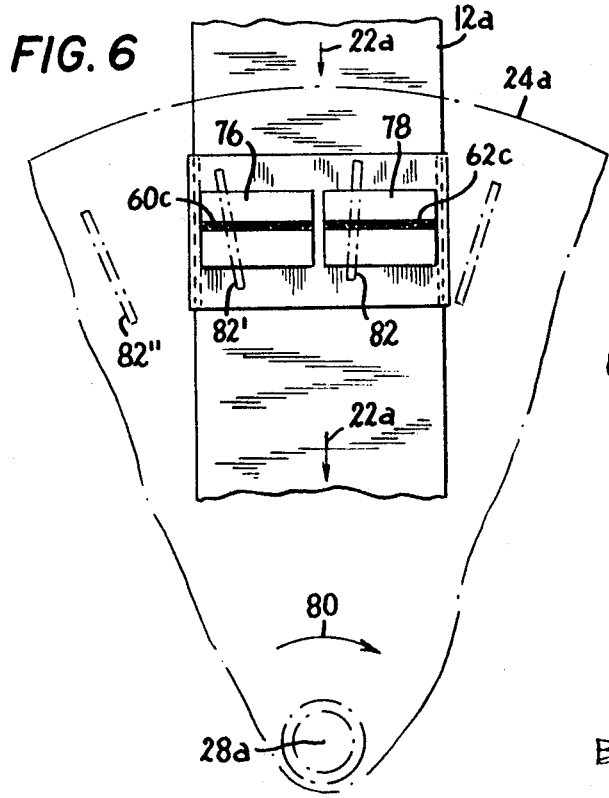
FIG. 6
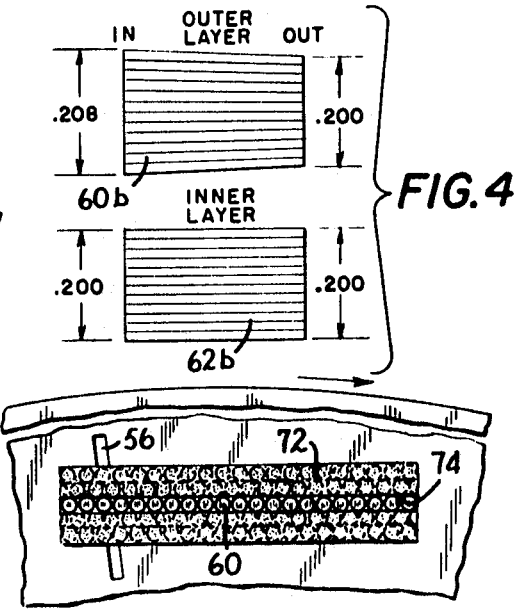
FIG. 4
FIG. 5
INVENTOR.
PETER C. GOLDMARK
BY
Brumbaugh, Graves, Donohue & Raymond
his ATTORNEYS 3,603,665

FIBER OPTICS DISK SCANNING SYSTEMS

BACKGROUND OF THE INVENTION

This invention relates to scanning apparatus and, more particularly, to novel and highly effective apparatus for simultaneously mechanically scanning two related frames of color TV film.

The information contained in a color TV film strip is conventionally divided between two related sets of frames, one containing luminance information and the other chrominance information, and corresponding frames of the two sets must be scanned simultaneously. Corresponding frames of the two sets may be relatively positioned in various ways, all of which present difficulties in scanning.

In one simple arrangement, the frames of one set alternate along the length of the film with those of the other set. In another simple arrangement, corresponding frames of the two sets are placed side by side in separate rows extending along the length of the film.

It is necessary to scan corresponding parts of corresponding frames simultaneously in order to produce a TV picture having the desired characteristics as regards luminance and chrominance.

SUMMARY OF THE INVENTION

An object of the present invention is to provide inexpensive scanning apparatus adapted to scan corresponding parts of related frames of information simultaneously. A further object of the invention is to provide mechanical scanning means adapted to scan corresponding parts of related frames of information rectilinearly, notwithstanding curvilinear motion of scanning slits formed on the scanning means.

The foregoing and other objects of the invention are attained, in representative scanning means constructed in accordance with the invention, by the provision of disk means having an axis and motive means for rotating the disk means about the axis. Narrow slit means is formed in the disk means, and a radiation source is provided for projecting radiation through the slit means. Fiber optics means operatively associated with the slit means transmits at least some of the radiation passing through the slit means. The fiber optics means is formed with entrance means and narrow straight line exit means so that the radiation emanating from the exit means lies in a given plane. The slit means traverses successive portions of the entrance means as the disk means is rotated, whereby a small radiation spot emanates from the exit means and executes a rectilinear scan, notwithstanding curvilinear motion of the slit means as the disk means is rotated.

In one embodiment, the two fiber optics channels are respectively associated with two groups of disk slits at different radial positions on the disk, and at least one of the fiber optics channels is tapered so that the scanning spots execute scans of equal length, notwithstanding the lesser movement of the radially inner slits. In another embodiment, all of the slits are at the same radial position on the disk, the spacing between them equaling the spacing between the entrances to the fiber optics channels. In the latter embodiment, both fiber optics channels are untapered.

BRIEF DESCRIPTION OF THE DRAWING

An understanding of additional aspects of the invention may be gained from a consideration of the following detailed description of several representative embodiments thereof, taken in conjunction with the appended figures of the drawing, wherein:

FIG. 1 is a schematic sectional elevation of a first embodiment of apparatus constructed in accordance with the invention, particularly adapted to scan film in which the frames of two sets of related frames are arranged alternately in a single row;

FIGS. 2, 3 and 4 are fragmentary, schematic, developed views in a radially outward direction respectively illustrating three different forms of a portion of the apparatus of FIG. 1;

FIG. 5 is an enlarged sectional view taken along the line 5—5 of FIG. 1; and

FIG. 6 is a side elevation of another embodiment of apparatus constructed in accordance with the invention, particularly adapted to scan film in which the frames of two sets of related frames are respectively arranged in two rows, related frames being side by side.

DESCRIPTION OF THE PREFERRED EMBODIMENTS

FIG. 1 shows apparatus 10 constructed in accordance with the invention. A film strip 12 is trained about guide rolls 14 and 16, which force the film 12 firmly against the exit side 18 of a fiber optics device 20. The film 12 is unwound from a supply spool (not shown), and wound on a takeup spool (not shown). The film strip 12 is under tension so that it follows accurately the contour of the exit end 18 of the fiber optics device 20. Suitable drive means (not shown) such as a sprocket wheel or a capstan and idler roller advances the film in the direction indicated by the arrow 22.

In accordance with the invention, a scanning disk 24 is mounted adjacent to the entrance side 26 of the fiber optics device 20 and rotatably supported on a shaft 28.

The scanning disk 24 is maintained in the desired plane by air control means 30 including an air supply 32, a regulating valve 34, a cylindrical enclosure 36 and an annular flange 38 defining with the disk 24 an annular channel 40 for the escape of air along a passage indicated by arrows 42. Air is supplied from the source 32 to the control means 30 to keep the disk 24 in constant contact with the entrance side 26 of the fiber optics device 20 during rotation of the disk 24 at high speed. The disk 24 is mounted with sufficient play to be responsive to the guidance provided by the air control means 30. A portion 54 of the air control means 30 is transparent.

An optical system 44 is provided, including a source 46 of electromagnetic radiation, a reflector 48, and cylindrically curved lenses 50 and 52 which form line images of the source 56 at the entrance plane 26 of the fiber optics device 20.

In accordance with the invention, the disk 24 is provided with radially extending scanning slits 56 and 58 that synchronously sweep across radially outer and radially inner channels 60 and 62 formed in the fiber optics means 20.

FIGS. 2–4 show three representative forms that the channels 60 and 62 may take. The channels are shown in a developed or circumferentially offset relation so that the structure of each can be illustrated. In each embodiment, it is desired to scan corresponding points of corresponding lines of related frames simultaneously. In a typical case, the width of the film strip 12 to be scanned may be 0.200 inches. This means that the "out" or exit end of each of the channels 60 and 62 must be 0.200 inches wide. The channel 62 is the radially inner channel on the disk 24, and the channel 60 is the radially outer channel. The scanning slit 58 is associated with the channel 62 has a lower tangential velocity than the scanning slit 56 associated with the channel 60. In accordance with the invention, compensation is made for this relationship by tapering at least one of the channels.

In FIG. 2, the outer channel 60 is untapered, measuring 0.200 inches across at the entrance and exit sides. The channel 62 is tapered from the exit side toward the entrance side, measuring 0.200 inches at the exit side and 0.192 inches at the entrance side.

The relationship is such that, as the slot 56 arrives at a point 64 of the channel 60, the slot 58 simultaneously arrives at point 66 of the channel 62. The slot 56 sweeps across the entrance to the channel 60 in exactly the same time required for the slot 58 to sweep across the entrance to the channel 62. Accordingly, at the instant the slot 56 arrives at the end 68 of the entrance to the channel 60, the slot 58 arrives at the end 70 of the entrance to the channel 62.

In the embodiment of FIG. 3, the length of the exit slit of the channels 60a and 62a remains 0.200 inches. In this embodiment, both the radially outer channel 60a and the radially inner channel 62a are tapered, the radially outer channel 60a measuring 0.204 inches at the entrance, and the radially inner channel 62a measuring 0.196 inches at the entrance.

In the embodiment of FIG. 4, it is the radially inner channel 62b that untapered, measuring 0.200 inches across at both the entrance and exit, the radially outer channel 60b being tapered from 0.208 inches at the entrance side to 0.200 inches at the exit side.

In all of the embodiments, there is a taper of at least one of the channels, so that, notwithstanding the difference in the length of the entrance to the fiber optics device 20 swept by the slits 56 and 58 per unit time, the same width of the related frames on the film strip 12 is scanned per unit time. In the embodiment of FIG. 2, the taper of the channel 62 from the exit side toward the entrance side is 4 percent; in the embodiment of FIG. 4, the taper of the channel 60b from the entrance side toward the exit side is 4 percent; in the embodiment of FIG. 3, where the taper is equally split between the channels 60a and 62a, each of the channels is tapered by 2 percent, the channel 60a being tapered from the entrance toward the exit, and the channel 62a being tapered from the exit toward the entrance.

An infinite number of combinations is possible. For example, both of the channels can be tapered in the same direction, so long as one is tapered more than the other by an amount sufficient to compensate for the difference in their radial positions along the disk 24. The total differential taper, illustrated as 4 percent, is of course related to the difference in tangential velocities of scanning slits. In general, scanning disks having scanning slits that are relatively closely spaced apart in a radial direction require small differential tapers, while scanning disks having scanning slits relatively widely spaced apart in a radial direction require large differential tapers. In the light of the present disclosure, those skilled in the art can readily determine the required differential taper in any given case.

In order to provide a small scanning spot, the lateral or circumferential dimension of the scanning slits 56 and 58 is made small, and a mask is provided, conveniently at the exit side 18 of the fiber optics device 20, the mask being formed with a slit having a small dimension parallel to the direction of motion of the film strip 12 (and nearly orthogonal to the small dimension of the slits 56 and 58 as they traverse the fiber optics device 20). These relationships are shown in FIG. 5, in which the portions of the fiber optics means that are masked are shown at 72 and a boundary of the portion exposed by the mask slit is shown at 74.

FIG. 6 shows another embodiment of the invention, adapted to the case where related frames 76 and 78 are arranged side by side on the film strip 12a. The film strip 12a moves, as in the embodiment of FIG. 1, in the direction indicated by arrows 22a. The scanning disk 24a turns, as in the embodiment of FIG. 1, in the direction indicated by an arrow 80. The scanning slits 82, 82', etc., are all at the same radial distance from the axis 28a of revolution of the scanning disk 24a.

The separation between adjacent scanning slits 82, 82', etc., is equal to the separation between corresponding points of lines to be scanned simultaneously on the related frames 76 and 78. Thus, as one scanning slit 82 causes scanning of the frame 78, the next succeeding scanning slit 82' simultaneously causes scanning of a related line of the frame 76. The scanning slit 82' that scans the frame 76 next scans the frame 78, and the next succeeding scanning slit 82'' simultaneously scans the frame 76. In this manner, the related frames 76 and 78 are simultaneously scanned line by line. In this embodiment, the fiber optics channels need not be tapered, inasmuch as both of the channels 60c and 62c are at the same radial distance from the axis 28a of the scanning disk 24a.

Because of the straight line formation of the exit of the channel 60 effected by the mask slit 74 and the corresponding straight line formation of the exits of the remaining illustrated fiber optics channels, the scanning spots formed by the intersections of the fiber optics channels and disk scanning slits execute rectilinear or straight line scans, notwithstanding curvilinear motion of the slit means as the disk means is rotated. Further, the two scanning sports simultaneously generated execute scans of equal length, notwithstanding the lesser movement of the portion of the slit means associated with the radially inner location (embodiment of FIG. 1) as compared to the movement of the portion of the slit means associated with the radially outer location.

It is, of course, not necessary that the entrance to the fiber optics channels be straight. They can, for example, be curved along the arcs respectively traversed by the scanning slits or given some other shape, the important requirement being that the exit slits of the fiber optics means (conveniently formed by slit masks) conform to the desired line to be scanned on the film 12.

The film 12 can be previously exposed, in which case the information thereon is read out by means of photomultipliers or other devices (not shown), or it may be unexposed, and means for modulating the scanning spots may be provided, in which case the film is recorded upon. Means for recording and readout are conventional and well known to those skilled in the art and need not be described in detail here.

The combination of radial slits on the disk and masking slits at the exit ends of the fiber optics device minimizes the fiber optics shear that would otherwise result in jagged scanning lines. In addition, it minimizes the effects of radial inaccuracies and permits easier alignment, both initially and subsequently for maintenance purposes. Also, it reduces the tolerances required for the fiber optics. While the fiber optics means is illustrated in FIG. 5 as including one optical fiber across the width of the masking slit, another number, three for example, may be employed, depending on the width of the masking slit, the diameter of the available fibers, and the desired resolution.

Thus there is provided in accordance with the invention novel and highly effective disk scanning apparatus particularly adapted for scanning color TV film. The apparatus combines high efficiency with low cost. In particular, the simplicity and reliability of a rotating disk scanner are attainable together with a desired rectilinear scan, and a plurality of related frames can be scanned simultaneously.

Many modifications of the representative embodiments of the invention described above will occur to those skilled in the art. For example, the radial slits 56 and 58 can be replaced by small round apertures, thus obviating the masking illustrated in FIG. 5. The entrances to the fiber optics channels in such case are arcuate, to cooperate with the apertures, while the exits can still be shaped to provide rectilinear scan of the film.

We claim:

1. In scanning apparatus for simultaneously scanning corresponding parts of two separate, related frames on a moving film, the combination comprising a scanning disk, means mounting said disk rotatably about an axis, aperture means formed in said disk and providing a plurality of areas on said disk in which radiation can pass through said disk, fiber optics means formed with a pair of segregated entrances and a pair of segregated exits, means mounting said fiber optics means adjacent to said disk, a radiation source, means mounting said radiation source in such a manner that said radiation source projects radiation through said aperture means at said spaced-apart areas as two of said areas respectively traverse said two entrances, said entrances being positioned with respect to each other in a manner which is a function of the separation between said spaced-apart areas on said disk and said exits being positioned with respect to each other in a manner which is a function of the separation between corresponding parts of said related frames, and means for moving said film and rotating said disk at respective velocities such that said related frames are simultaneously scanned line by line.

2. Scanning apparatus according to claim 1 further comprising platen means mounted parallel to and closely spaced apart from said disk and means for forcing a fluid to flow between said platen means and said disk to maintain said disk in a desired plane.

3. Scanning apparatus according to claim 1 wherein all of said spaced-apart areas on said disk have the same radial coordinate, thereby facilitating scanning of a film in which the related frames are placed side by side in separate rows extending along the length of the film.

4. Scanning apparatus according to claim 1 wherein the scans of said related frames are of equal length.

5. Scanning apparatus according to claim 1 wherein the scans of said related frames are rectilinear.

6. Scanning apparatus according to claim 1 wherein said entrances are rectilinear and said aperture means are radially elongated.

7. Scanning apparatus according to claim 1 wherein said spaced-apart areas on said disk are divided into two groups, all of the first group having a first radial coordinate and all of the second group having a second radial coordinate different from the first radial coordinate, thereby facilitating scanning of a film in which the related frames are arranged alternately in a single row extending along the length of the film.

8. Scanning apparatus according to claim 1 wherein said entrances are of unequal dimensions.